United States Patent
Aoki et al.

(10) Patent No.: US 8,334,039 B2
(45) Date of Patent: Dec. 18, 2012

(54) ULTRAVIOLET-CURABLE RESIN COMPOSITION AND OPTICAL INFORMATION RECORDING MEDIUM

(75) Inventors: Mayumi Aoki, Okegawa (JP); Hirokazu Saito, Ageo (JP)

(73) Assignee: DIC Corporation, Tokyo (JP)

( * ) Notice: Subject to any disclaimer, the term of this patent is extended or adjusted under 35 U.S.C. 154(b) by 856 days.

(21) Appl. No.: 11/995,731

(22) PCT Filed: Jul. 13, 2006

(86) PCT No.: PCT/JP2006/313964
§ 371 (c)(1),
(2), (4) Date: Jan. 15, 2008

(87) PCT Pub. No.: WO2007/010820
PCT Pub. Date: Jan. 25, 2007

(65) Prior Publication Data
US 2009/0148648 A1  Jun. 11, 2009

(30) Foreign Application Priority Data
Jul. 15, 2005  (JP) ................................ 2005-206936

(51) Int. Cl.
*B32B 3/02* (2006.01)
*G11B 7/24* (2006.01)

(52) U.S. Cl. ................. 428/65.1; 428/64.4; G9B/7.181; G9B/7.182

(58) Field of Classification Search ................. 428/64.4, 428/65.1; 522/99; 525/474, 479; 528/26, 528/32, 41; G9B/7.181, 7.182
See application file for complete search history.

(56) References Cited

U.S. PATENT DOCUMENTS

| | | | |
|---|---|---|---|
| 5,242,719 A * | 9/1993 | Medford et al. | 427/515 |
| 5,904,795 A | 5/1999 | Murakami et al. | |
| 7,393,623 B2 * | 7/2008 | Conroy et al. | 430/270.1 |
| 2001/0031369 A1 * | 10/2001 | Reusmann | 428/483 |
| 2003/0134931 A1 * | 7/2003 | Chatterjee et al. | 522/178 |
| 2004/0121268 A1 * | 6/2004 | Conroy et al. | 430/321 |
| 2004/0181087 A1 | 9/2004 | Hayashida et al. | |
| 2005/0018595 A1 * | 1/2005 | Conroy et al. | 369/288 |
| 2005/0147809 A1 | 7/2005 | Hongo et al. | |

FOREIGN PATENT DOCUMENTS

| | | |
|---|---|---|
| JP | 10-110118 A | 4/1998 |
| JP | 10-166736 A | 6/1998 |
| JP | 10-168139 A | 6/1998 |
| JP | 2004-292430 A | 10/2004 |
| JP | 2004-335021 A | 11/2004 |
| JP | 2005-111756 A | 4/2005 |
| JP | 2005-133026 A | 5/2005 |
| WO | 2004/042704 A2 | 5/2004 |
| WO | 2005/032814 A1 | 4/2005 |

* cited by examiner

*Primary Examiner* — Gerard Higgins
(74) *Attorney, Agent, or Firm* — McDermott Will & Emery LLP

(57) ABSTRACT

The present invention provides an ultraviolet-curable resin composition, comprising a silicone compound represented by the following formula (1):

[Chemical Formula 1]

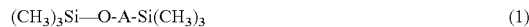

(wherein A represents a group in which n structural units represented by a chemical formula (2) and m structural units represented by a chemical formula (3) are bonded in a random form or block form, n is an integer ranging from 1 to 15, n/m is 1/5 to 1/20, and two structural units represented by the above chemical formulas (2) and (2), (2) and (3), (3) and (3) are not bonded by oxygen-oxygen bond and a photocurable compound that reacts with the silicone compound. The present invention also provides an optical information recording medium having a surface protective layer with an excellent spot prevention function and spot wipe-ability.

8 Claims, No Drawings

ULTRAVIOLET-CURABLE RESIN COMPOSITION AND OPTICAL INFORMATION RECORDING MEDIUM

CROSS-REFERENCE TO PRIOR APPLICATION

This is a U.S. National Phase Application under 35 U.S.C. §371 of International Patent Application No. PCT/JP2006/313964 filed Jul. 13, 2006, which claims the benefit of Japanese Patent Application No. 2005-206936 filed Jul. 15, 2005, both of which are incorporated by reference herein. The International Application was published in Japanese on Jan. 25, 2007 as WO 2007/010820 A1 under PCT Article 21(2).

TECHNICAL FIELD

The present invention relates to an ultraviolet-curable resin composition useful for a surface protective layer of an optical information recording medium, and an optical information recording medium provided with a surface protective layer made of the ultraviolet-curable resin composition.

BACKGROUND ART

There are a variety of types of optical information recording media, for example, an optical disk in which a cured film made of an active energy ray curable resin composition is formed on an information recording layer formed on a substrate in order to protect the information recording layer, or an bonded type optical disk in which two substrates provided with an information recording layer on at least one of them are bonded to each other using a cured film made of an active energy ray curable resin composition, etc.

An information recording layer refers to a laminate including a layer formed on an optical disk substrate made of a synthetic resin such as polycarbonate and constituted by an unevenness called a pit, a phase change material, coloring matter or the like, and a semi-transparent reflective film or a perfect reflective film formed on the above layer for reflecting a laser beam for reading information. The semi-transparent reflective film or the perfect reflective film is formed on the uppermost layer of the information recording layer and is typically constituted by a thin film made of a metal or metal alloy.

A typical example of the bonded type optical disk includes DVD (Digital Versatile Disk or Digital Video Disk). Among the bonded type optical disks, in DVDs, there are a variety of types of read-only DVDs. For example, an optical disk named "DVD-10" is manufactured by providing unevenness called a pit responsible to recording information on one side of a substrate; preparing for example, two polycarbonate substrates used for optical disk thereon as a layer for reflecting a laser beam for reading information, the substrate being provided with aluminum layers; and bonding the two polycarbonate substrates by adhering the aluminum layers as an adhesion layer. "DVD-5" is manufactured by bonding the substrate used to manufacture "DVD-10" and a normal transparent polycarbonate substrate without an information recording layer. "DVD-9" is manufactured by bonding a substrate in which an aluminum reflective film is formed on pits provided in one side of the substrate and a substrate in which a semi-transparent reflective film, which is made of gold or an alloy containing gold as a main component, silver or an alloy containing silver as a main component, a silicone compound, or the like, is formed on one side of the substrate by adhering the two reflective films as an adhesion layer. "DVD-18" is manufactured by bonding two substrates, each of which has one side having two information layers formed thereon. At present, "DVD-9" having large recording capacity and allowing two-layered information to be read from one side is being widely used.

DVD may be generally divided into a read-only type and a writable type. A writable DVD includes a recordable type such as DVD-R and DVD+R, and a rewritable type such as DVD-RW, DVD+RW and DVD-RAM. Among these DVDs, DVD-R and DVD+R of the recordable type have a characteristic that uses an organic coloring matter for a recording layer, unlike other DVDs. In a recordable type optical disk, the optical property is changed or unevenness is formed irreversibly by irradiating the substrate with a laser beam, thereby forming a recording layer. For the recording layer, for example, cyanine-based, phthalocyanine-based, and azo-based organic coloring matters, which are decomposed by heat from the laser beam irradiation, thereby changing the optical constant thereof and causing deformation of the substrate by the volume change, are used.

Although many of such methods have been developed, the optical disks using various recording methods developed in succession require in common that a signal written on an information recording layer should be stably read and that occurring of signal reading error should be highly suppressed. In recent years, in particular, since spots such as fingerprints adhered to a surface of a polycarbonate substrate through which a laser beam passes scatter the laser beam, thereby making it impossible to read a signal written on an information layer, it has been studied to form a protective layer on the surface of the polycarbonate substrate to facilitate removal of spots.

As one of measures against the above problem, there has been proposed a method in which a non-crosslinked fluorine-based surfactant is mixed in a hard coating agent (see Patent Document 1). However, this method can not achieve a spot prevention function sufficiently since the fluorine-based surfactant is present only in a portion of a surface of the protective layer, and therefore requires further improvement. In addition, since the fluorine-based surfactant is merely mixed in the hard coating agent, there may arise a problem of deterioration of the spot prevention function after lapse of a long period of time or when the protective layer is left under a high-temperature and high-humidity circumstance.

For an optical recording disk having an excellent fingerprint wipe-ability, there has been disclosed an optical recording disk having a jitter rise rate of not more than 1.15 times when sticking and wiping out an adhered artificial fingerprint liquid (see Patent Document 2). This document discloses that the hard coat layer includes an active energy ray curable silicone-based compound in order to provide an excellent water-repellency and lubricity. However, in this document, the disclosed silicone-based compounds are merely enumerated without being specified to attain an optical recording disk having a jitter rise rate of not more than 1.15. Although this document discloses an example employing polydimethylsiloxane having reactive acrylolyl group at its end, it is difficult for this compound to prevent spots and obtain spot wipe-ability, therefore further improvement is required. In addition, many of the enumerated silicone-based compounds insoluble with an acrylate-based polymerizable monomer forming a hard coat layer, and, if used, require a solvent which should be removed in a later process of forming a coating film.

[Patent Document 1] Japanese Patent Unexamined Application, First Publication No. Hei 10-110118

[Patent Document 2] Japanese Patent Unexamined Application, First Publication No. 2004-335021

DISCLOSURE OF THE INVENTION

Problems to be Solved by the Invention

The object of the present invention is to provide an ultraviolet-curable resin composition able to form a surface protective layer having an excellent spot prevention function and spot wipe-ability in that spots such as fingerprints are hardly adhered to the surface protective layer and, if any, the spots can be removed without difficulties, and an optical information recording medium provided with the surface protective layer having an excellent spot prevention function and spot wipe-ability.

Means for Solving the Problems

In the present invention, the ultraviolet-curable resin composition includes a silicone compound having a suitable solubility with a photocurable compound and having a particular structure in which side chain structure is reactive with the photocurable compound, thereby making it possible to form a cured film in which the siloxane structure is strongly immobilized on the entire surface of the cured film at a high existence probability. Accordingly, the ultraviolet-curable resin composition of the present invention allows the cured film to show an excellent spot prevention function and spot wipe-ability, and exhibit a stable antifouling property even after lapse of a long period of time or even when the cured layer is left under a high-temperature and high-humidity circumstance.

That is, the present invention provides an ultraviolet-curable resin composition including a silicone compound represented by the following formula (1):

[Chemical Formula 1]

$$(CH_3)_3Si\text{—}O\text{-}A\text{-}Si(CH_3)_3 \quad (1)$$

(wherein A represents a group in which n structural units represented by the following

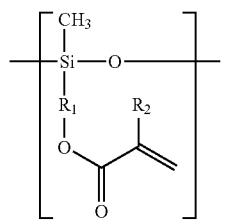

(2)

(wherein $R_1$ represents a bivalent group in which (i) and (ii) are bonded, (i) represents an alkylene group having 1 to 18 carbon atoms, (ii) represents a bivalent group in which plural alkylene groups having 2 to 18 carbon atoms are linked by ether bond, R1 is bonded with Si directly or through an oxygen atom, R2 represents a hydrogen atom or a methyl group), and m structural units represented by the following formula (3):

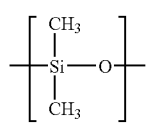

(3)

are bonded in a random form or in block form, n is an integer ranging from 1 to 15, n/m is 1/5 to 1/20, and the two structural units represented by the above chemical formulas (2) and (2), (2) and (3), (3) and (3) are not bonded by oxygen-oxygen bond; and a photocurable compound that reacts with the silicone compound. The present invention also provides an optical information recording medium including a cured film made of the above-mentioned ultraviolet-curable resin composition, as a surface protective layer.

EFFECTS OF THE INVENTION

Since the ultraviolet-curable resin composition to form the surface protective layer of the optical information recording medium of the invention contains the silicone compound having a particular structure having a reactive group which can react with other ultraviolet-curable compounds, it can exhibit an excellent spot prevention function.

In particular, if the optical information recording medium of the present invention is an optical information recording medium of a type to write/read information into/from an information recording layer from a side of a surface protective layer, the following effects are obtained.

If spots are adhered to a surface of a transparent substrate at which information is written/read into/from an information recording layer, a laser beam emitted from a side of a transparent substrate may be scattered, thereby making it impossible to write/read the information into/from the information recording layer. This scattering appears remarkable when conventional ultraviolet-curable resin compositions are used. However, when the ultraviolet-curable resin composition contains the silicone compound having the above-mentioned structure as an additive, spots are hardly adhered to a surface protective layer and, if any, the spots can be removed without difficulty. Accordingly, the optical information recording medium using the ultraviolet-curable resin composition of the present invention does not have difficulty in writing/reading information into/from an information recording layer due to such scattering.

BEST MODE FOR CARRYING OUT THE INVENTION

Hereinafter, the present invention will be described in detail. In the present description, a (meth)acrylic acid is an acrylic acid or a methacrylic acid, and it is the same in derivatives an acrylic acid or a methacrylic acid.

[Ultraviolet-Curable Resin Composition]

An ultraviolet-curable resin composition of the present invention contains, as essential components, a silicone compound having the chemical structure described above and a photocurable compound reacting with the silicone compound. Accordingly, the cured film obtained using the ultraviolet-curable resin composition has an excellent antifouling property and spot wipe-ability of the silicone compound on the overall film while maintaining an excellent light-transmission.

(Silicone Compound)

The silicone compound which is used for the ultraviolet-curable resin composition of the present invention and represented by the above chemical formula (1) has a part having a suitable solubility with a photocurable compound and a part reactive with the photocurable compound in a specified ratio as a side chain structure. When the ultraviolet-curable resin composition including the silicone compound is coated in the form of a film, in the vicinity of the surface of the coated film, a force is exerted, by which a siloxane binding site of a main chain, which is likely to raise a phase separation, is phase-separated from the photocurable compound, and a force is exerted, by which a side chain having solubility is dissolved with the photocurable compound. Therefore, it is believed that there is a high possibility that a siloxane structure exists. When the photocurable compound is cured by irradiating the coated film with an ultraviolet ray, the photocurable compound reacts with a reactive group of the side chain of the silicone compound, which results in a high possibility of the existence of the siloxane structure in a surface layer of a cured film. At this time, since a plurality of side chains become anchors for one silicone compound, the silicone compound is strongly immobilized on the cured film. This allows the ultraviolet-curable resin composition of the present invention to form the cured film having excellent antifouling property and spot wipe-ability and to exhibit the antifouling property stably even after a lapse of a long period of time or even when the cured film is left under a high-temperature and high-humidity circumstance. On the contrary, a silicone compound without the structure of the present invention does not exert a plurality of anchor effects, which results in insufficient immobilization, and does not have parts having different solubilities, which may result in difficulty in raising the possibility of existence of the siloxane structure in the vicinity of the surface layer. As a result, the antifouling property and spot wipe-ability of the cured film may be deteriorated.

A in the above chemical formula (1) represents a group having a structure including n structural units represented by the above chemical formula (2) and m structural units represented by the above chemical formula (3), which are bonded in a random form or in block form. A random form refers to a structure including n structural units represented by the above chemical formula (2) and m structural units represented by the above chemical formula (3), which are bonded out of order and in an irregular order, and block form refers to a structure in which n structural units represented by the above chemical formula (2) alternate with m structural units represented by the above chemical formula (3). n used herein is an integer ranging from 1 to 15, preferably an integer ranging from 1 to 10. A ratio of n to m (n/m) is 1/5 to 1/20, preferably 1/5 to 1/15. The two structural units represented by the above chemical formulas (2) and (2), (2) and (3), (3) and (3) are not bonded by oxygen-oxygen bond by oxygen-oxygen bond.

$R_1$ in the chemical formula (2) is a group described in the following item (i) or (ii), or having a structure in which two or more selected from the groups described in the following items (i) and (ii) are bonded.

(i) alkylene groups having 1 to 18 carbon atoms

For example, represents $—CH_2—$, $—CH_2CH_2CH_2—$, $—CH_2CH(CH_3)—$, $—CH_2(CH_2)_4CH_2—$, $—CH_2CH(CH_2CH_3)CH_2CH_2CH_2CH_2—$, $—CH_2(CH_2)_{10}CH_2—$, or $CH_2(CH_2)_{16}CH_2—$, etc.

(ii) bivalent groups having a polyoxyalkylene structure in which plural alkylene groups each having 2 to 18 carbon atoms are bonded by ether bond The groups of item (ii) maybe represented by $—(OR)_p—$ (where, R represents allkylene group having 2 to 18 carbon atoms, which may have a branched chain, p represents an integer of 1 or more). The groups of item (ii) may include $—(OCH_2CH_2)_p—$, $—(OC_3H_6)_p—$, $—(OCH_2CH_2CH_2)_p—$, $—(OCH_2(CH_2)_{10}CH_2)_p—$, etc. and may also include groups having a structure in which $—OR—$ having different lengths of chains, for example, groups bonded randomly with $—OCH_2CH_2—$ and $—OCH_2CH(CH_3)—$ are randomly bonded. If the groups of item (ii) are used as $R_1$, it is preferable to use groups having a polyether structure having a plurality of ether bonds (polyoxyalkylene structure). The groups of item (ii) may be obtained from alkylene oxides such as ethylene oxide, propylene oxide, butylenes oxide and the like, cyclic ether polymers such as tetrahydrofuran, alkyl-substituted tetrahydrofuran and the like, or copolymers of two ore more kinds of these polymers.

Among the above-mentioned groups, it is preferable that $R_1$ is a group selected from an alkylene group having 1 to 6 carbon atoms, a bivalent group represented by $—(OR)_t—$ (where, R represents an ethylene group or a propylene group, and t represents an integer ranging from 2 to 20) and a bivalent group in which ethylene oxide and propylene oxide are subjected to random ring-opening addition polymerization, or a group in which two or more groups selected from the above groups are bonded. In particular, among these groups, it is preferable that $R_1$ be $—CH_2CH_2CH_2—$, $—CH_2CH_2CH_2(OCH_2CH_2)_p—$ (where, p is an integer of 2 or more), or $—CH_2CH_2CH_2Y—$ (where, Y is a group in which $—OC_2H_4—$ and $—OC_3H_6—$ are randomly bonded). It is preferable that the bond between the group of item (ii) and Si has a structure in which an alkylene group is interposed therebetween although an oxygen atom is also permissible to be interposed. In addition, it is preferable that one end of the groups of item (i) in $R_1$ be directly bonded with Si although an oxygen atom is also permissible to be interposed therebetween. In addition, $R_2$ in the chemical formula (2) is a hydrogen atom or a methyl group, preferably the hydrogen atom.

The silicone compound represented by the chemical formula (1) is a commercially available one, for example, TEGO Rad 2200N available from Degussa Co., Ltd.

The silicone compound represented by the chemical formula (1) is preferably 2000 to 12000, more preferably 3000 to 8000 in number-average molecular weight.

The content of the silicone compound represented by the chemical formula (1) in the ultraviolet-curable resin composition is 0.05 to 5 parts by mass, preferably 0.1 to 2.0 parts by mass with respect to the ultraviolet-curable resin composition. With this range, spots are hardly adhered to a surface of a surface protective layer of the optical information recording medium of the present invention and, if adhered, may be wiped off the surface without difficulty, thereby keeping an excellent spot prevention function stable for a long period of time.

(Photocurable Compound)

As the photocurable compound used in the present invention, there may be used various kinds of photocurable compounds such as unsaturated polyester-based, acryl-based, thiol-ene-based, epoxy-based compounds, and the like as long as the photocurable compounds have reactivity with the silicone compound and are cured by irradiation of an ultraviolet ray. When the photocurable compound is used for the surface protective layer of the optical information recording medium, the photocurable compound may be suitably selected in consideration of hardness, elasticity modulus, adhesion with substrate, viscosity in application, etc.

Among these photocurable compounds, it is preferable to use the acryl-based photocurable compound having an excellent transparency and weatherability for the optical information recording medium. An example of the acryl-based photocurable compound may include polymerizable monomers and polymerizable oligomers as shown below.

Examples of monofunctional (meth)acrylates may include ethyl(meth)acrylate, butyl (meth)acrylate, 2-ethylhexyl (meth)acrylate, nonyl(meth)acrylate, tridecyl (meth)acrylate, hexadecyl(meth)acrylate, octadecyl(meth)acrylate, isoamyl (meth)acrylate, isodecyl(meth)acrylate, isostearyl (meth)acrylate, 2-hydroxyethyl(meth)acrylate, 3-chloro-2-hydroxypropyl(meth)acrylate, methoxyethyl(meth)acrylate, butoxyethyl(meth)acrylate, benzyl(meth)acrylate, nonylphenoxyethyl(meth)acrylate, tetrahydrofurfuryl (meth)acrylate, glycidyl(meth)acrylate, 2-hydroxy-3-phenoxypropyl(meth) acrylate, nonylphenoxyethyltetrahydrofurfuryl(meth)acrylate, caprolactone-modified tetrahydrofurfuryl(meth)acrylate, acryloylmorpholine, phenoxyethyl(meth)acrylate, etc. In addition, examples of alicyclic monomers may include isobonyl(meth)acrylate, norbornyl(meth)acrylate, 2-(meth) acryloyloxymethyl-2-methylbicycloheptaneadamantyl (meth)acrylate, dicyclopentenyl(meth)acrylate, dicyclopentanyl(meth)acrylate, dicyclopentenyloxyethyl(meth) acrylate, tetracyclododecanyl(meth)acrylate, cyclohexyl (meth)acrylate, etc.

Examples of difunctional (meth)acrylates may include 1,4-butanediol di(meth)acrylate, 3-methyl-1,5-petanediol di(meth)acrylate, 1,6-hexanediol di(meth)acrylate, neopentylglycol di(meth)acrylate, 2-methyl-1,8-octanedioldi(meth) acrylate, 2-butyl-2-ethyl-1,3-propanediol di(meth)acrylate, ethyleneglycol di(meth)acrylate, polypropyleneglycol di(meth)acrylate, di(meth)acrylate of diol obtained by adding 4 moles or more of ethylene oxide or propylene oxide to 1 mole of neopentylglycol, ethylene oxide-modified phosphoric(meth)acrylate, ethyleneoxide-modified alkylated phosphoric(meth)acrylate, diethyleneglycol di(meth)acrylate, dipropyleneglycol di(meth)acrylate, tripropyleneglycol di(meth)acrylate, polyether(meth)acrylate, diethylaminoethyl (meth)acrylate, N-vinylpyrrolidone, N-inylcaprolactam, vinylethermonomer, etc. In addition, examples of alicyclic difunctional (meth)acrylates may include norbornanedimethanol diacrylate, norbornanediethanol di(meth) acrylate, di(meth)acrylate of diol obtained by adding 2 moles of ethyleneoxide or propyleneoxide to norbornanedimethanol, tricyclodecane dimethanol di(meth)acrylate, tricyclodecane diethanoldi(meth)acrylate, di(meth)acrylate of diol obtained by adding 2 moles of ethylene oxide or propyleneoxide to tricyclodecane dimethanol, pentacyclopentadecane dimethanoldi(meth)acrylate, pentacyclopentadecane diethanoldi(meth)acrylate, di(meth)acrylate of diol obtained by adding 2 moles of ethylene oxide or propylene oxide to pentacyclopentadecane dimethanol, di(meth)acrylate of diol obtained by adding 2 moles of ethylene oxide or propyleneoxide to pentacyclopentadecane diethanol, dimethyloldicyclopentane di(meth)acrylate, etc.

These monofunctional and difunctional (meth)acrylates may be suitably used to adjust the viscosity at the time applying, the crosslinking density, etc. Among these, tetrahydrofurfuryl (meth)acrylate, 1,6-hexanediol di(meth)acrylate, neopentylglycol di(meth)acrylate, caprolactone modified tetrahydrofurfuryl (meth)acrylate, acryloylmorpholine, isobornyl(meth)acrylate, ethyleneglycol di(meth)acrylate, polypropyleneglycol di(meth)acrylate, di(meth)acrylate of diol obtained by adding 4 moles or more of ethylene oxide or propyleneoxide to 1 mole of neopentylglycol, diethylene glycoldi(meth)acrylate, dipropyleneglycol di(meth)acrylate, tripropyleneglycol di(meth)acrylate, and polyether(meth) acrylate are preferable since they can provide an excellent adhesive property when polycarbonate is used as a laminating substrate and, tetrahydrofurfuryl(meth)acrylate, 1,6-hexanedioldi(meth)acrylate, and neopentylglycoldi(meth)acrylate are particularly preferable.

In addition, since those having an alicylic structure have a strong cyclic structure, it is possible to provide the obtained cured film with a high elasticity modulus at a high temperature and a high glass transition temperature.

Examples of tri or more functional (meth)acrylates may include multifunctional (meth)acrylates such as bis(2-acryloyloxyethyl)hydroxyethyl isocyanurate, bis(2-acryloyloxypropyl)hydroxypropyl isocyanurate, bis(2-acryloyloxybutyl)hydroxybutylisocyanurate, bis(2-methacryloyloxyethyl) hydroxyethyl isocyanurate, bis(2-methacryloyloxypropyl) hydroxypropyl isocyanurate, bis(2-methacryloyloxybutyl) hydroxybutyl isocyanurate, tris(2-acryloyloxyethyl) isocyanurate, tris(2-acryloyloxypropyl)isocyanurate, tris(2-acryloyloxybutyl)isocyanurate, tris(2-methacryloyloxyethyl)isocyanurate, tris(2-methacryloyloxypropyl)isocyanurate, tris(2-methacryloyloxybutyl)isocyanurate, trimethylolpropane tri(meth)acrylate, pentaerythritol tri(meth)acrylate, pentaerythritol tetra(meth)acrylate, dipentaerythritol penta(meth)acrylate, di or tri(meth)acrylate of triol obtained by adding 3 moles or more of ethylene oxide or propylene oxide to 1 mole of dipentaerythritolhexa(meth)acrylatetrimethylolpropane, poly(meth)acrylate of dipentaerythritol, etc.

These tri or more functional (meth)acrylates can provide the cured film with a high elasticity modulus. Among them, tris(2-acryloyloxyethyl)isocyanurate, tris(2-methacryloyloxyethyl)isocyanurate, trimethylolpropanetri(meth)acrylate, pentaerythritoltri(meth)acrylate, pentaerythritoltetra (meth)acrylate, dipentaerythritolpenta(meth)acrylate, and dipentaerythritolhexa(meth)acrylate are particularly preferable since they can provide a very high elasticity modulus after being cured.

In addition to the above mentioned (meth)acrylates, epoxy (meth)acrylates having a strong structure may also be preferably included. Examples of the epoxy(meth)acrylates may include bisphenol A type epoxy(meth)acrylate synthesized by reaction of (meth)acrylic acid with a reaction product of bisphenol A and epichlorohydrin, bisphenol S type epoxy (meth)acrylate synthesized by reaction of (meth)acrylic acid with a reaction product of bisphenol S and epichlorohydrin, bisphenol F type epoxy(meth)acrylate synthesized by reaction of (meth)acrylic acid with a reaction product of bisphenol F and epichlorohydrin, phenolnovolac type epoxy(meth) acrylate synthesized by reaction of (meth)acrylic acid with a reaction product of phenolnovolac and epichlorohydrin, etc. These bisphenol type epoxy(meth)acrylates can provide the obtained cured film with a high elasticity modulus and high hardness. Among them, the bisphenol A type epoxy(meth) acrylate is preferably used.

In addition, polymerizable oligomers may be suitably used, and polyester(meth)acrylate, polyether(meth)acrylate, polyurethane(meth)acrylate, etc. may be used in combination.

The ultraviolet-curable resin composition of the present invention preferably contains bisphenol type epoxyacrylate, and may be suitably adjusted in terms of hardness, elasticity modulus, adhesion with substrate, viscosity in application, etc. by using trifunctional (meth)acrylates, monofunctional and/or difunctional (meth)acrylates in combination. Although the contents of these components may be suitably adjusted depending on required properties, the content of epoxy(meth)acrylate in the ultraviolet-curable resin composition is preferably 1 to 30% by mass, more preferably 5 to 15% by mass. With this range of the content of epoxy(meth) acrylate, it is possible to provide the obtained cured film with high hardness and also properly adjust viscosity in application. The content of trifunctional (meth)acrylate in the ultraviolet-curable resin composition is preferably 30 to 80% by mass, more preferably 40 to 70% by mass. In addition, the content of monofunctional and/or difunctional (meth)acrylate in the ultraviolet-curable resin composition is preferably 5 to 50% by mass, more preferably 10 to 40% by mass. Although the ratio of mono-, di- and trifunctional (meth)acrylates may be suitably adjusted depending on the kind of (meth)acrylate used, with the above-mentioned range, it is possible to adjust viscosity in application and crosslinking density after being cured within a suitable range, thereby making it possible to provide the cured film with high hardness while reducing warp of the cured film.

(Polymerization Initiator)

A photopolymerization initiator may be used for the ultraviolet-curable resin composition of the present invention, if necessary. Although any of photopolymerization initiators known in the art may be used, molecule cleavage type or hydrogen abstraction type photopolymerization initiators may be suitably used for the ultraviolet-curable resin composition.

Examples of the photopolymerization initiators may include molecule cleavage type photopolymerization initiators such as benzoinisobutylether, 2,4-diethylthioxantone, 2-isopropylthioxantone, benzyl, 1-hydroxycyclohexylphenylketone, benzomethylether, benzyl dimethyl ketal, 2-hydroxy-2-methyl-1-phenylpropan-1-one, 1-(4-isopropylphenyl)-2-hydroxy-2-methylpropan-1-one, 2-methyl-1-(4-methylthiophenyl)-2-morpholinopropan-1-one, and the like, and hydrogen abstraction type photopolymerization initiators such as benzophenone, 4-phenylbenzophenone, isophthalphenone, 4-benzoyl-4'-methyl-diphenylsulfide, and the like.

It is preferable that the photopolymerization initiator not absorb a wavelength of light for information reading or writing in an optical information recording medium. For example, a photopolymerization initiator having low light absorption at a wavelength of about 400 nm is preferably used for application to a blue laser disk.

(Additives)

Any components to be added in the ultraviolet-curable resin composition can be used as long as they do not deteriorate the effect of the present invention and may include the following. For example, sensitizers for the photopolymerization initiator may include trimethylamine, methyldimethanolamine, triethanolamine, p-dimethylaminoacetophenone, ethyl p-dimethylaminobenzoate, isoamyl p-dimethylaminobenzoate, N,N-dimethylbenzylamine, 4,4'-bis(diethylamino)benzophenone, etc. In addition, amines which do not generate an addition reaction with the aforementioned photopolymerized compound may be used in combination. Of course, among these components, it is preferable to select and use those that have high solubility with the ultraviolet-curable resin composition and do not deteriorate ultraviolet ray transmission.

In addition, although the ultraviolet-curable resin composition may contain inorganic components such as silica particles to increase hardness of the cured film, a solvent to disperse the inorganic particles may not be used. In addition, since there arises no problem of light scattering due to the inorganic particles, it is preferable not to contain the inorganic particles in the ultraviolet-curable resin composition.

(Viscosity)

It is preferable that the ultraviolet-curable resin composition of the present invention has viscosity so high that a film can be formed in application, particularly by a spin coater from a standpoint of the manufacturing process. Although the viscosity may be suitably adjusted depending on the thickness of a film to be film, it is preferable that it falls within a range from 20 to 150 mPa·s if the surface protective layer of the optical information recording medium is formed to be thin.

[Optical Information Recording Medium]

The optical information recording medium includes the surface protective layer which is formed of the cured film made of the ultraviolet-curable resin composition on at least one surface of the medium.

(Surface Protective Layer)

Since the surface protective layer formed on the surface of the optical information recording medium of the present invention is constituted by the cured film made of the ultraviolet-curable resin composition, the surface protective layer can transmit light well and exhibit excellent antifouling property and spot wipe-ability even after a lapse of a long period of time and when the surface protective layer is left under a high-temperature and high-humidity circumstance. Accordingly, the optical information recording medium of the present invention can suitably perform information reading and writing operations using light, without hardly generating light scattering on the surface of recording medium information.

It is preferable that the surface protective layer has high hardness in order to prevent it from being damaged. For example, the surface protective layer has a surface pencil hardness of, preferably 2H or more, more preferably 4H or more. Since the ultraviolet-curable resin composition of the present invention can increase the density of silicone compound in the vicinity of the surface of the cured film, a film having an excellent slide-ability and high hardness can be formed without difficulty.

An elasticity modulus of the surface protective layer is preferably 1000 to 3000 MPa, more preferably 1500 to 2500 MPa at 25° C. If the elasticity modulus is lower than the minimum value in this range, the surface protective layer may become soft. On the other hand, if the elasticity modulus is higher than the maximum value in this range, the surface protective layer may become fragile.

(Layer Configuration)

The optical information recording medium of the present invention is not particularly limited in its configuration as long as the surface protective layer can be formed on at least one surface of the outermost layer. For example, the optical information recording medium may have either (i) a configuration where at least one light-reflective layer is laminated on a side of a substrate and the surface protective layer is formed on the reverse side of the substrate on which the light-reflective layer is laminated or (ii) a configuration where at least one light-reflective layer is laminated on a substrate and the surface protective layer is formed on the outermost layer opposite to the substrate.

An example of the configuration (i) may include a DVD-R or a DVD-ROM in which a surface protective layer is formed on the outermost layer onto which light is incident, and an example of the configuration (ii) may include a blue laser disk or the like in which a surface protective layer is formed on the outermost layer onto which light is incident. These optical information recording media may be read-only optical information recording media in which pits are formed in a substrate or an intermediate layer, or writable/readable optical information recording media having a phase change type information recording layer. In particular, the read-only optical information recording media exhibit particularly excellent effects.

Hereinafter, as appropriate embodiments of the present invention, examples of manufacturing "DVD-5", "DVD-10", "DVD-9", "DVD-18", and "blue laser disk" will be described without being limited thereto.

(Manufacture of DVD-9)

One substrate (A) for an optical disk in which a 40 to 60=n metal thin film (reflective layer) is laminated on unevenness, which is called pit and responsible for recording information and another substrate (B) for an optical disk in which a 10 to 30 nm semi-transparent film (semi-transparent reflective layer) made of silver or an alloy having silver as a main component is laminated on unevenness, which is called pit and responsible for recording information, are prepared.

The reflective layer may be made of, for example, a material containing aluminum as a main component, silver, or an alloy containing silver as a main component. Substrates for an optical disk known in the art may be used as the substrate of the optical disk of the present invention. For example, a substrate made of amorphous polyolefin, polymethyl methcrylate, polycarbonate, or the like may be used, in particular, polycarbonate is preferably used as the substrate for the optical disk of the present invention.

Next, the ultraviolet-curable resin composition is applied on the metal thin film of the substrate (A), the substrate (B) on which the semi-transparent film is laminated is bonded to the substrate (A) through the ultraviolet-curable resin composition which is applied on the metal thin film, so that the film surface of the semi-transparent film can be an adhesive surface, and then, the two substrates irradiated by an ultraviolet ray from a single side or both sides, thereby manufacturing "DVD-9". The optical disk of the present invention is obtained by forming the surface protective layer, which is constituted by the cured film made of the ultraviolet-curable resin composition containing the compound represented by the above chemical formula (1), at film thickness of 2 to 5 μm on a surface of a transparent substrate through which a laser beam passes.

In addition, a substrate on which grooves are formed may be used to form a writable/readable optical disk on which an information recording layer and a light reflective layer are laminated. The information recording layer may be any of a phase change type recording layer, a magneto-optical recording layer and an organic coloring matter type recording layer as long as they can write/read information.

If the information recording layer is the phase change type recording layer, the information recording layer may be generally constituted by a dielectric layer and a phase change film. The dielectric layer requires a function of buffering heat generated in the phase change layer and a function of adjusting disk reflectivity, and is made of a mixed composition of ZnO and $SiO_2$. The phase change film is a film in which the difference of reflectivity between amorphous state and crystalline state appears by phase changing of the film, and may be made of a Ge—Sb—Te-based, a Sb—Te based, or an Ag—In—Sb—Te based alloy.

An organic coloring matter used for the organic coloring matter recording layer may be typically an azo-based coloring matter, but is not particularly limited as long as it can form pits using a laser beam used for recording information. For example, the organic coloring matter may include cyanine-based, phthalo cyanine-based, naphthalo cyanine-based, anthraquinone-based, triphenyl methane-base, pyrylium or thiapyrylium salt-based, squaryllum-based, chroconuim-based, formazan-based, metal complex coloring matter-based organic coloring matter, and the like. In addition, the organic coloring matter may be used in combination with a singlet oxygen quencher. The quencher preferably include acetyl acetonate-based, bisdithiol-based such as bisdithio-α-diketone-based or bisphenylditiol-based, thiocatecol-based, salicylaldehideoxime-based, thiobisphenolate-based metal complex, and the like. In addition, amine-based quenchers of amine compound or hindered amine having nitrogen radical cations may be suitably used. The materials used for each information recording layer may be the same or not.

(Manufacture of DVD-18)

After manufacturing DVD-9 as described above, by peeling off only the substrate (A), with the metal thin film (reflective layer) formed on the substrate (A) left on the substrate (B), a disk intermediate body in which substrate (B)/semi-transparent film (semi-transparent reflective layer)/cured film of ultraviolet-curable resin composition/metal thin film (reflective layer) are laminated sequentially are manufactured. The two disk intermediate bodies are prepared. Next, "DVD-18" is obtained by bonding the two metal thin films (reflective layers) formed on the disk intermediate bodies, so that the one is opposite to the other one. In the same way, the optical disk of the present invention is obtained by forming the surface protective layer, which is constituted by the cured film made of the ultraviolet-curable resin composition containing the compound represented by the above chemical formula (1), at a film thickness of 2 to 5 μm.

(Manufacture of DVD-10)

Two substrates of (C1) and (C2) for an optical disk in which a 40 to 60 nm thin film made of silver or an alloy including silver as a main component is laminated on unevenness, which is called pit which and responsible for recording information, are prepared. The ultraviolet-curable resin composition is applied on the thin film of the substrate (C1), the substrate (C1) is bonded to the substrate (C2), with the ultraviolet-curable resin composition, which is applied on the film of the substrate (C1), interposed between the substrates (C1) and (C2), and with a surface of the film of the substrate (C2) as an adhesive surface, and then, the substrates (C1) and (C2) are adhered to each other by irradiation of an ultraviolet ray from a single side or both sides of the two substrates (C1) and (C2), thereby manufacturing "DVD-10". In the same way, the optical disk of the present invention is obtained by forming the surface protective layer, which is constituted by the cured film made of the ultraviolet-curable resin composition containing the compound represented by the above chemical formula (1), at a film thickness of 2 to 5 μm.

(Manufacture of DVD-5)

A substrate (D) for an optical disk in which a 40 to 60 nm thin film made of silver or an alloy including silver as a main component is laminated on unevenness, which is called pit and responsible for recording information, is prepared. Separately, a substrate (E) for optical disk having no pit is prepared. The ultraviolet-curable resin composition is applied on the metal thin film of the substrate (D), the substrate (D) is bonded to the substrate (E), with the ultraviolet-curable resin composition interposed between the substrates (D) and (E), and then, the substrates (D) and (E) are adhered to each other by irradiation of an ultraviolet ray from a single side or both sides of the two substrates (D) and (E), thereby manufacturing "DVD-5". In the same way, the optical disk of the present invention is obtained by forming the surface protective layer, which is constituted by the cured film made of the ultraviolet-curable resin composition containing the compound represented by the above chemical formula (1), at film thickness of 2 to 5 μm.

As for the irradiation method of ultraviolet, for example, a continuous light irradiation method using a metal halide lamp, a high pressure mercury lamp or the like may be used. Also, the flashing irradiation method disclosed in U.S. Pat. No. 5,904,795 may be used. The flashing irradiation method is more preferable from a standpoint of efficiency of curing.

Here, means for irradiation of the ultraviolet ray may include, for example, an ultraviolet irradiation device employing the continuous light irradiation method using a high pressure mercury lamp, a metal halide lamp, or the like, and an ultraviolet irradiation device employing the flashing irradiation method using xenon flash or the like.

(Manufacture of Blue Laser Disk)

For a read-only blue laser disk, a 1.1 mm thick or so optical disk substrate (F) in which a 40 to 60 nm thin film made of silver or an alloy including silver as a main component is laminated on unevenness, which is called a pit and responsible for recording information, and a sheet (G) made of polycarbonate or the like are bonded to each other through the ultraviolet-curable resin composition, and then, the optical disk substrate (F) and the sheet (G) are adhered to each other by irradiation of an ultraviolet ray from a single side or both sides of the substrate (F) and the sheet (G). Thereafter, the blue laser disk of the present invention is obtained by forming the surface protective layer, which is constituted by the cured film made of the ultraviolet-curable resin composition containing the compound represented by the above chemical formula (1), at a film thickness of 2 to 5 μm. In addition, the sheet (G) may be formed of a cured film made of an ultraviolet-curable resin composition, and the surface protective layer, which is constituted by the cured film made of the ultraviolet-curable resin composition containing the compound represented by the above chemical formula (1), may be formed on a surface of the sheet (G). In addition, the blue laser disk may have a multi-layered structure where two or more recording layers are formed, or may be an optical disk in which a phase change type information recording layer and a light reflective layer are formed by using a substrate provided with grooves.

EXAMPLES

The present invention will be further described in the following examples but without being limited thereto. The term "parts" as used hereinafter is meant to indicate "parts by mass."

Examples 1 to 2 and Comparative Examples 1 to 3

<Preparation of Optical Disk Samples)

Compositions of examples and comparative examples are applied on a polycarbonate substrate for an optical disk having a thickness of 1.2 mm and diameter of 120 mm such that the thickness of a cured film for a protective layer becomes 5 to 8 μm after curing, and the cured film is formed by irradiation of an ultraviolet ray with light intensity of 0.5 J/cm$^2$ (measured by intergrating actinometer of UVPF-36, available from EYEGRAPHICS Co., Ltd.) using a 120 W/cm concentrated high pressure mercury lamp (H03-L31, available from EYEGRAPHICS Co., Ltd.), thereby manufacturing optical disk samples for evaluation.

<Preparation of Artificial Fingerprint Liquid>

An artificial fingerprint liquid is prepared by adding 1 part of triolein with respect to 10 parts of methoxy propane as a diluent, and adding 0.4 parts of Kanto loam, which is test powder of No. 1, type of No. 11, defined by JIS Z8901 thereafter, and then mixing.

<Preparation of Original Form for Pseudo Fingerprint Pattern Transfer>

About 1 ml of the artificial fingerprint liquid is collected while mixing, the collected liquid applied on the polycarbonate substrate (having diameter of 120 mm and thickness of 1.2 mm) using a spin-coat method. This substrate is heated at 60° C. for 3 minutes, and then, methoxypropanol is removed from the substrate, thereby obtaining an original form for pseudo fingerprint pattern transfer.

<Transfer and Wipe of Pseudo Fingerprint Pattern>

An edge surface (having a diameter of 20 mm) of silicone rubber stopper No. 7, which is smaller than another edge surface is polished with a sandpaper (CC 150-Cw available from NIHON KENSHI Co., Ltd.), thereby preparing a pseudo fingerprint transfer material. An artificial fingerprint liquid component is transferred onto a edge surface of the pseudo fingerprint transfer material, with the edge surface of the pseudo fingerprint transfer material being pressed against the original form under a load of 52N for 10 seconds. The artificial fingerprint liquid component is transferred onto a site apart by about 37 mm in a radial direction from the center of a surface of a disk on which the ultraviolet-curable resin composition is formed, with the edge surface of the pseudo fingerprint transfer material to which the artificial fingerprint liquid component is adhered, being pressed against the site under a load of 52N for 10 seconds.

Next, the artificial fingerprint liquid component adhered to a surface of each disk sample is wiped off according to the following order. An 8-stacked tissue paper (available from Corelex Group Co., Ltd.) is inserted between a edge surface (having diameter of 25 mm) of a larger side of the silicone rubber stopper No. 7 and the disk surface to which the artificial fingerprint liquid component is adhered, and pressed with a force of 5 N. Under this condition, the silicone rubber stopper is slowly moved from the center of the disk sample to the circumference of the disk sample, thereby wiping off the adhered artificial fingerprint liquid component.

<Measurement of PI Error>

A PI error of a recorded signal for each disk sample is measured at the time before the artificial fingerprint liquid component is adhered to the disk sample (early stage) and after the wiping operation is carried out twice. The result is shown in Table 1.

The PI error is measured using "SA-300", available from Audio Development Co., Ltd. In addition, a PI error ratio (the number of errors after test/the number of errors before test) is calculated and evaluated.

Evaluation on the PI error is marked in Table 1 as follows.

"Excellent": not greater than 2 in PI error ratio

"Good": not smaller than 2 and not greater than 5 in PI error ratio

"Fair": not smaller than 5 and not greater than 6 in PI error ratio

"Bad": not smaller than 6 in PI error ratio

<Test on Durability under High-Temperature and High-Humidity Circumstances>

Disk samples prepared in the same way as Example 1, Comparative Example 2 and Comparative Example 4 are subjected to an exposure test for 240 hours under high-temperature and high-humidity circumstances of 80° C. and 85% RH using PR-2PK (available from ESPEC Corporation), and then a PI error of a recorded signal for each disk sample is measured before the artificial fingerprint liquid component is adhered to the disk sample and after the wiping operation is carried out twice. The result is shown in Table 2.

TABLE 1

| | | | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|---|---|
| Raw material composition (parts by mass) | Photopolymerizable compound | PETA | 35 | 35 | 35 | 35 | 35 | 35 | 35 |
| | | NPGDA | 28 | 28 | 28 | 28 | 28 | 28 | 28 |
| | | TMPTA | 30 | 30 | 30 | 30 | 30 | 30 | 30 |
| | Silicone compound | TEGO Rad 2200N | 0.5 | 2 | | | | | |
| | | BY-16-152D | | | | | | 0.5 | |
| | | BY-16-152 | | | | | | | 0.5 |
| | Additives | L-7002 | | | | 0.5 | 2 | | |
| | Photopolymerization initiator | HPCA | 7 | 7 | 7 | 7 | 7 | 7 | 7 |
| Evaluation | PI error Number in parenthesis: PI error ratio | Before artificial fingerprint liquid is adhered (early stage) | 16 | 14 | 39 | 18 | 21 | 2.6 | — |
| | | After wiping operation is performed twice | 17 (1.1) Excellent | 35 (2.5) Good | Unmeasurable Bad | 127 (7.1) Bad | 112 (5.3) Fair | 103 (39.6) Bad | — |

Abbreviations in Table 1 represent the following compounds.

PETA: Pentaerytritoltetraacrylate
NPGDA: Neopentyl glycol diacrylate
TMPTA: Trimethylol propane triacrylate
HCPK: 1-hydroxy cyclohexyl phenylketone
TEGO Rad 2200N: Reactive polysiloxane (available from Degussa Co., Ltd.)
The compound can be represented by the above chemical formula (1), wherein n is 3, n/m is 1/10, $R_1$ is —$CH_2CH_2CH_2X_1$— (where, $X_1$ represents a group having 20 —$OC_2H_4$—s in average and 6 —$OC_3H_6$—s in average, which are randomly bonded, and $X_1$ is bonded with acryloyl group in the above chemical formula (1)), $R_2$ is a hydrogen, and the compound having a number-average molecular weight of 4000.
L-7002: Polyoxy alkylene dimethyl polysiloxane (available from Nippon Unicar Co., Ltd.)
BY-16-152D: Methacrylate-modified silicone oil represented by the following chemical formula (4), available from Dow Corning Toray Co., Ltd.,

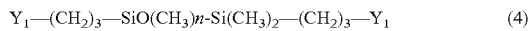

$$Y_1-(CH_2)_3-SiO(CH_3)n\text{-}Si(CH_3)_2-(CH_2)_3-Y_1 \quad (4)$$

Where, $Y_1$ represents a methacryloyloxy group. A weight-average molecular weight is 386.

BY-16-152: Methacrylate-modified silicone oil represented by the above chemical formula (4) (available from Dow Corning Toray Co., Ltd.), the weight-average molecular weight is 5600.

As is apparent from Table 1, the optical disk using the cured film made of the ultraviolet-curable resin composition in Examples 1 and 2 of the present invention shows substantially the same PI error as in the early stage if the artificial fingerprint liquid adhered on the surface of the disk is removed. In addition, as is apparent from Table 2, the increase of error is very small even after the exposure test under high-temperature and high-humidity circumstances.

On the other hand, for the optical disks of Comparative Examples 1 to 4, when the artificial fingerprint liquid is applied on the surface of the disks, it can be seen that the PI error is significantly increased since the spot prevention function and spot wipe-ability of the optical disk protective layer are insufficient. In addition, for Comparative Example 5, the silicone compound is not dissolved with the photocurable compound.

INDUSTRIAL APPLICABILITY

Since the ultraviolet-curable resin composition of the present invention contains a silicone compound having a particular structure, it exhibits excellent spot prevention function and spot wipe-ability when it is used for the surface protective layer of the optical information recording medium. Accordingly, the optical information recording medium using the ultraviolet-curable resin composition of the present invention does not have difficulty in writing/reading information into/from an information recording layer due to scattering of a laser beam emitted from a side of a transparent substrate. Accordingly, the optical information recording medium of the present invention exhibits stable antifouling property even after a lapse of a long period of time or when it

TABLE 2

| | | | Ex. 1 | Comp. Ex. 2 | Comp. Ex. 4 |
|---|---|---|---|---|---|
| Raw material composition (parts by mass) | Photopolymerizable compound | PETA | 35 | 35 | 35 |
| | | NPGDA | 28 | 28 | 28 |
| | | TMPTA | 30 | 30 | 30 |
| | Silicone compound | TEGO Rad 2200N | 0.5 | | |
| | | BY-16-152D | | | 0.5 |
| | | BY-16-152 | | | |
| | Additives | L-7002 | | 0.5 | |
| | Photopolymerization initiator | HPCA | 7 | 7 | 7 |
| Evaluation | PI error after exposure test, Number in parenthesis: PI error ratio | Before artificial fingerprint is adhered | 48.1 | 41.3 | 39.3 |
| | | After wiping operation is performed twice | 78.1 (1.62) Excellent | 924.7 (22.4) Bad | 758.5 (19.3) Bad | is left under a high-temperature high humidity circumstance, which may result in high industrial usefulness.

The invention claimed is:

1. An optical information recording medium comprising a surface protective layer formed on at least one surface of the optical information recording medium, wherein the surface protective layer includes a cured film made from an ultraviolet-curable resin composition, comprising:

a silicone compound represented by formula (1):

$(CH_3)_3Si—O—A—Si(CH_3)_3$     (1)

wherein A represents a group in which
n structural units are represented by formula (2):

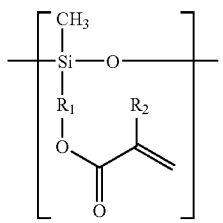

(2)

wherein $R_1$ represents a bivalent group in which (i) and (ii) are bonded, (i) represents an alkylene group having 1 to 18 carbon atoms, (ii) represents a bivalent group in which plural alkylene groups having 2 to 18 carbon atoms are linked by ether bond, $R_1$ is bonded with Si directly or through an oxygen atom, $R_2$ represents a hydrogen atom or a methyl group, and m structural units represented by formula (3):

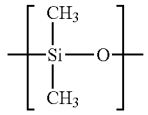

(3)

are bonded in a random form or block form, n is an integer ranging from 1 to 15, n/m is 1/5 to 1/20, the two structural units represented by the above chemical formulas (2) and (2), (2) and (3), (3) and (3) are not bonded by oxygen-oxygen bond; and trimethylolpropanetri(meth)acrylate, wherein the silicone compound is 0.05 to 5% by mass with respect to the ultraviolet-curable resin composition.

2. The optical information recording medium according to claim 1, wherein at least one light-reflective layer is laminated on a substrate and the surface protective layer is formed on the reverse side of the substrate from the light-reflective layer.

3. The optical information recording medium according to claim 1, wherein at least one light-reflective layer is laminated on a substrate and the surface protective layer is formed on an outermost layer opposite to the substrate.

4. The optical information recording medium according to claim 1, wherein the number average molecular weight of the silicone compound is 200 to 12000.

5. The optical information recording medium according to claim 1, wherein the viscosity of the ultraviolet-curable resin composition is 20 to 150 mPa·s.

6. The optical information recording medium according to claim 1, wherein said (i) represents $—CH_2—$, $—CH_2CH_2CH_2—$, $—CH_2CH(CH_3)—$, $—CH_2(CH_2)_4CH_2—$, $CH_2CH(CH_2CH_3)CH_2CH_2CH_2CH_2—$, $—CH_2(CH_2)_{10}CH_2—$, or $CH_2(CH_2)_{16}CH_2—$;

said (ii) represents $—(OCH_2CH_2)_p—$, $—(OC_3H_6)_p—$, $(OCH_2CH_2CH_2CH_2)_p—$, $—(OCH_2(CH_2)_{10}CH_2)_p—$ wherein p represents an integer of 1 or more, or a group in which $—OCH_2CH_2—$ and $—OCH_2CH(CH_3)—$ are randomly bonded.

7. The optical information recording medium according to claim 1, wherein $R_1$ represents $—CH_2CH_2CH_2Y—$, where, Y is a group in which $—OC_2H_4—$ and $OC_3H_6—$ are randomly bonded.

8. The optical information recording medium according to claim 1, wherein the surface protective layer has a pencil hardness of 2H or more.

* * * * *